US008393891B2

(12) United States Patent
Boardman et al.

(10) Patent No.: US 8,393,891 B2
(45) Date of Patent: Mar. 12, 2013

(54) DISTRIBUTED-JET COMBUSTION NOZZLE

(75) Inventors: Gregory Allen Boardman, Greer, SC (US); Thomas Edward Johnson, Greer, SC (US)

(73) Assignee: General Electric Company, Schenectady, NY (US)

(*) Notice: Subject to any disclaimer, the term of this patent is extended or adjusted under 35 U.S.C. 154(b) by 1255 days.

(21) Appl. No.: 11/532,546

(22) Filed: Sep. 18, 2006

(65) Prior Publication Data

US 2010/0313569 A1 Dec. 16, 2010

(51) Int. Cl.
*F23C 5/00* (2006.01)

(52) U.S. Cl. ............... 431/8; 431/12; 431/22; 431/350; 431/351; 431/354; 60/741; 60/746; 60/737; 239/214.11; 239/214.17

(58) Field of Classification Search ............... 431/350, 431/354, 351, 12, 22, 281, 116, 172, 186, 431/10, 353; 60/741, 746, 737; 110/336; 239/214.11, 214.17, 8

See application file for complete search history.

(56) References Cited

U.S. PATENT DOCUMENTS

| 3,570,763 | A | * | 3/1971 | Hughes | 239/8 |
| 4,431,403 | A | * | 2/1984 | Nowak et al. | 431/183 |
| 5,049,066 | A | * | 9/1991 | Kaiya et al. | 431/352 |
| 5,109,806 | A |  | 5/1992 | Duggan et al. | |
| 5,203,689 | A | * | 4/1993 | Duggan et al. | 431/114 |
| 5,586,878 | A | * | 12/1996 | Dobbeling et al. | 431/351 |
| 6,331,109 | B1 | * | 12/2001 | Paikert et al. | 431/350 |
| 7,029,272 | B2 | * | 4/2006 | Jordan et al. | 431/278 |
| 7,621,131 | B2 | * | 11/2009 | Von Der Bank | 60/737 |
| 2004/0131986 | A1 | * | 7/2004 | Stalder et al. | 431/278 |

FOREIGN PATENT DOCUMENTS

JP 3140706 A 6/1991

OTHER PUBLICATIONS

The AU Office Action issued in connecion with the corresponding AU Application No. 2007203445 on Feb. 10. 2011.
Japanese Office Action dated Dec. 20, 2011 from corresponding Application No. 2007-238997, along with unofficial English translation.

* cited by examiner

*Primary Examiner* — Steven B McAllister
*Assistant Examiner* — Avinash Savani
(74) *Attorney, Agent, or Firm* — Sutherland Asbill & Brennan LLP

(57) ABSTRACT

A combustion nozzle for use in a turbine. The combustion nozzle may include a center body and a cone extending from the center body. The cone may include a number of apertures positioned therein.

17 Claims, 2 Drawing Sheets

DISTRIBUTED-JET COMBUSTION NOZZLE

TECHNICAL FIELD

The present application relates generally to gas turbine engines and more particularly relates to a combustion nozzle for use with a gas turbine combustion chamber.

BACKGROUND OF THE INVENTION

Lean premixed combustion in gas turbine engines tends to be susceptible to combustion driven oscillations such as dynamic instability. The risk of such instability increases as the flame temperature in such lean premixed systems is continually lowered to reduce $NO_x$ emissions. Flame temperatures have been driven near to the lean blowout limit, at least with fuels having a high methane content. For such lean mixtures, slight variations in the local fuel to air mixture ratio may result in periodic variations in the local heat released and the heat release rates. Discrete oscillation frequencies or tones can grow in amplitude when the heat release fluctuations are constructively in phase with the acoustic pressure fluctuations encountered inside the combustion chamber.

As the present lean premix combustors become leaner and more spatially uniform, the risk of encountering unacceptably high levels of dynamics may go up. Combustion dynamics typically have been abated by shifting the fuel injection points to alter the fuel transport time from the point of injection to the flame front, by changing the fuel injection orifice sizes to alter the pressure drop and the acoustic impedance across the apertures, or by modifying the chamber or nozzle geometries to affect vortex shedding, frequencies and amplitudes, or flame shape. These abatement efforts attempt to force any perturbations in the heat release to be out of phase (or destructively in phase) with the pressure or acoustic perturbations in the combustion chamber. Adding acoustic dampening to the combustion system also has reduced combustion dynamics. These methods, however, usually involve trial and error and can be expensive and uncertain.

There is a desire, therefore, for an improved lean premixed combustion system that meets applicable $NO_x$ emission regulations while reducing or eliminating dynamic instability. The system preferably maintains overall engine efficiency and provides tolerance to the fuel mixture quality.

SUMMARY OF THE INVENTION

The present application thus describers a combustion nozzle for use in a turbine. The combustion nozzle may include a center body and a cone extending from the center body. The cone may include a number of apertures positioned therein.

The cone may be made out of nickel or cobalt alloys. The cone may include an angle from a longitudinal central axis of about twenty (20) to about (70) degrees. The cone may include a length of about one (1) inch to about twelve (12) inches (about 25.4 millimeters to about 305 millimeters). The apertures may include a diameter of about 0.05 to about 0.5 inches (about 1.27 to about 12.7 millimeters). About ten (10) to about 2000 apertures may be used.

The present application further describes a method of directing a flow of air and fuel through and about a nozzle cone to a combustion chamber. The method may include forcing a fraction of the flow of air and fuel through a number of apertures within the nozzle, burning the fraction of the flow of air and fuel as it exits the number of apertures, flowing the remainder of the flow of air and fuel over the nozzle, and burning the remainder of the flow of air and fuel in the combustion chamber.

The fraction ranges from about ten (10) to about ninety (90) percent. The step of burning the fraction of the flow of air and fuel as it exits the number of apertures may include burning in a number of discrete reaction zones. The step of burning the fraction of the flow of air and fuel as it exits the number of apertures may include a number of fuel transport times. The step of forcing a fraction of the flow of air and fuel through a number of apertures within the nozzle cone may include a nonswirling flow and the step of flowing the remainder of the flow of air and fuel over the nozzle may include a swirling flow. The method further may include the step of altering the ratio of the flow of fuel and air for the fraction of the flow of air and fuel.

The present application further describes a gas turbine engine. The gas turbine engine may include a swirler, a distributed-jet combustion nozzle assembly positioned within the swirler, and a combustion chamber positioned about the distributed jet combustion nozzle assembly.

The distributed jet combustion nozzle assembly may include a cone with a number of apertures positioned therein. The cone may include an angle from a longitudinal central axis of about twenty (20) to about (70) degrees and a length of about one (1) inch to about twelve (12) inches (about 25.4 millimeters to about 305 millimeters). The apertures may include a diameter of about 0.05 to about 0.5 inches (about 1.27 to about 12.7 millimeters). About ten (10) to about 2000 apertures may be used.

These and other features of the present application will become apparent to one of ordinary skill in the art upon review of the following detailed description when taken in conjunction with the several drawings and the appended claims.

DETAILED DESCRIPTION

Figure 1:
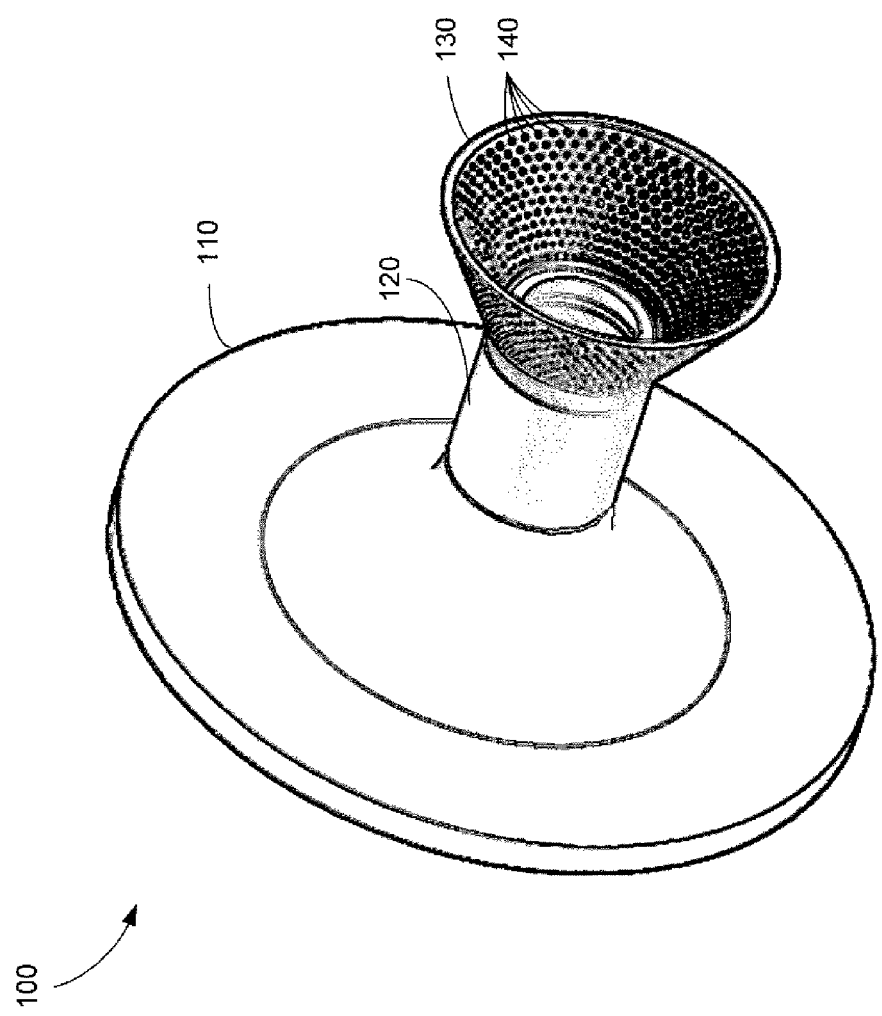
FIG. 1 is a perspective view of a nozzle cone of a distributed-jet combustion nozzle assembly according to one aspect of this application.
Figure 2:
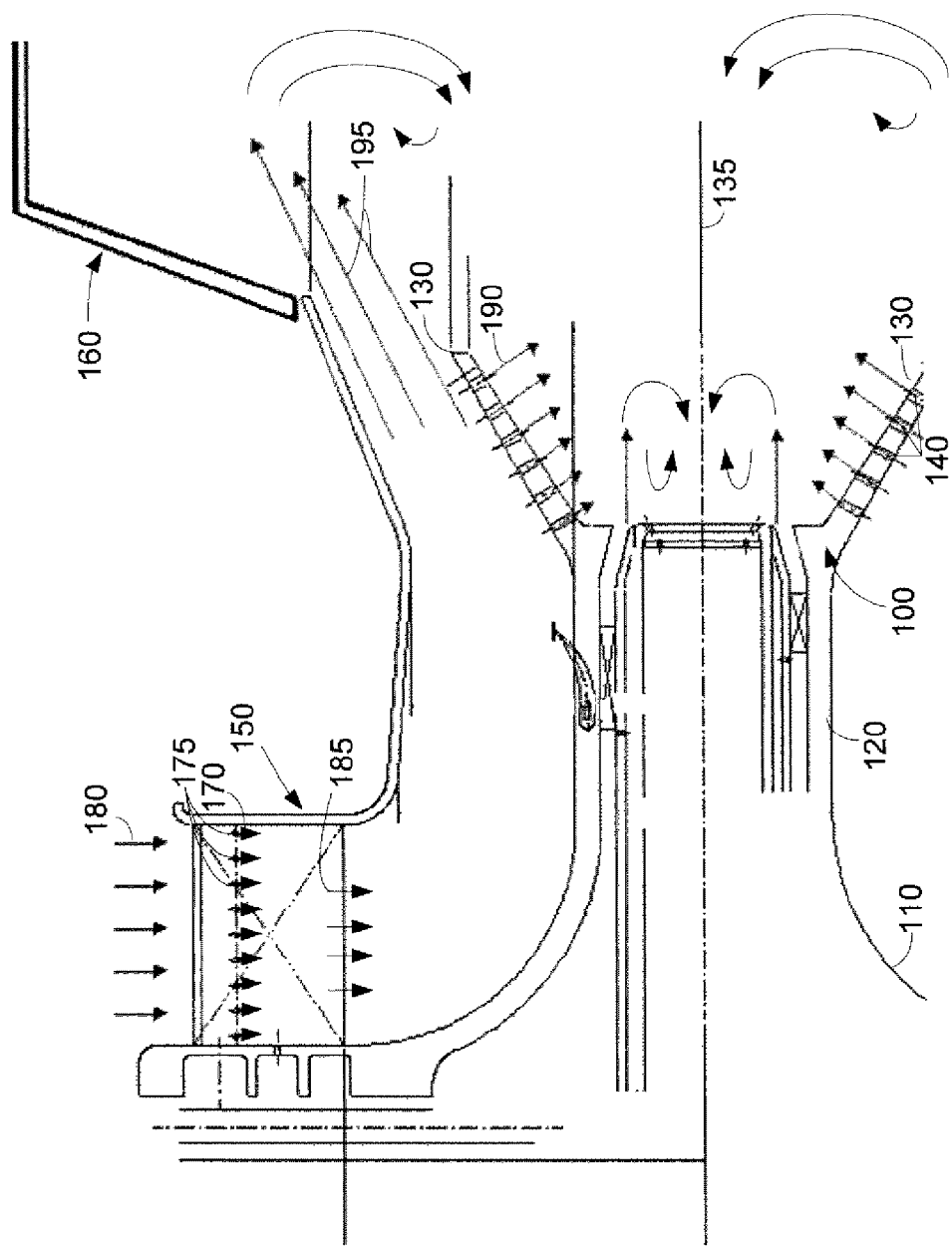
FIG. 2 is a partial side cross-sectional view of the distributed-jet combustion nozzle assembly of FIG. 1 as positioned relative to a combustion chamber of a gas turbine.

Referring now to the drawings in which like numerals refer to like elements throughout the several views, FIGS. 1 and 2 show a distributed-jet combustion nozzle assembly 100 according to one aspect of the application. As is shown, the nozzle assembly 100 includes a nozzle back plate 110. The nozzle back plate 110 may be largely circular in shape, although other shapes may be used herein. The base 110 leads to a center body 120. The center body 120 may be in the form of a hollow tube. The center body 120 may be connected to the back plate 110 or formed integrally therewith.

The center body 120 then expands into a conical flame holder or nozzle cone 130. The angle and size of the nozzle cone 130 may be varied. The nozzle cone 130 may have an angle from a longitudinal central axis 135 of about twenty (20) to about seventy (70) degrees. (The nozzle cone 130 itself may have a cone angle of about forty (40) to about 140 degrees.) The nozzle cone 130 may have a length of about one (1) inch to about twelve (12) inches (about 25.4 millimeters to about 305 millimeters), although any size may be used herein.

The nozzle cone 130 has a number of jets or apertures 140 positioned therein. The apertures 140 are perforations that extend through the nozzle cone 130. The nozzle cone 130 may have about ten (10) to about 2000 apertures 140, although any number of apertures 140 may be used herein. The apertures 140 may have any desired size, shape, or angle. In this example, the apertures 140 may have a diameter of about 0.05 to about 0.5 inches (about 1.27 to about 12.7 millimeters). The nozzle cone 130 as a whole may be made out of nickel or cobalt alloys, with or without thermal barrier coatings, ceramics, ceramic composites, or similar types of materials with good thermal resistance.

As is shown in FIG. 2, the nozzle assembly 100 may be positioned within or about a swirler assembly 150 of a fuel-air mixer and a combustion can 160.

The swirler 150 and the combustion can 160 may be of known construction. A flow of fuel 170 may be fed to and about the nozzle 100 via a number of fuel injectors 175 or otherwise. Likewise, a flow of combustion air 180 is fed about the nozzle 100 and the swirler 150. The flow of fuel 170 and the flow of air 180 then pass about the swirler 150 and towards the center body 120 of the nozzle assembly 100 as a mixed flow 185 of fuel and air.

A fraction of the mixed flow 185 passes through the apertures 140 of the nozzle cone 130 as a fractional flow 190. The fractional flow 190 is driven by pressure through the apertures 140 of the nozzle cone 130 and then ignited. The fractional flow 190 thus burns as an array through the perforated nozzle cone 130. The amount of the fractional flow 190 that passes through the nozzle cone 130 is in part a function of the size and shape of the nozzle cone 130 itself. The fraction can vary between 10 and 90% depending upon the size, shape, and the effective flow area of the nozzle cone 130 relative to the rest of the nozzle assembly 100.

The remainder of the mixed flow 185 cools the backside of the nozzle cone 130 as a remainder flow 195. The remainder flow 195 then expands and recirculates via vortex breakdown downstream of the nozzle cone 130 and then burns within the combustion chamber 160. The nature of the combustion within the central recirculation zone may be affected by many parameters, including the angle of the nozzle cone 130.

The nozzle assembly 100 thus is less likely to cooperate with combustion driven, discrete oscillation frequencies given that the fractional flow 190 is redirected through the apertures 140 in the nozzle cone 130 and burns as an array of discrete small jets. Specifically, the apertures 140 breakup the released heat into a multiplicity of discrete reaction zones and space such that each zone reacts at spatial scales that are much smaller than that of the overall combustion chamber 160. This effectively limits the amount of released energy that can constructively couple at a particular acoustic resonance frequency within the chamber 160. The use of the array of apertures 140 through the nozzle cone 130 thus abates discrete dynamics and improves emissions.

Further, the array of apertures 140 also provides a multiplicity of fuel transport times. This multiplicity distributes or smears out the heat release in time. Specifically, each aperture 140 has its own associated transport time, i.e., the time between the points of fuel injection and the point of burning. This effectively limits the amount of heat release energy that can constructively couple at a particular chamber acoustic resonance frequency. The relatively large cone 130 also has a passive dampening effect on acoustic waves in the combustion chamber 160 in that the nozzle cone 130 tends to defuse incidental acoustic energy.

The use of the nozzle assembly 100 also provides "ventilation" to the downstream central recirculation zone from vortex breakdown in the combustion chamber 160. Specifically, the expanding array of apertures 140 injects non-swirling flows directly into the central recirculation zone. This reduces the size and bulk residence time within the central recirculation zone. This, in turn, reduces $NO_x$ production by reducing the average time that the reactants spend at the primary zone (flame) temperature. The concept of "time and temperature" for $NO_x$ production becomes increasingly significant at flame temperatures above 2900 degrees Fahrenheit (about 1593 degrees Celsius). At this temperature, the thermal $NO_x$ mechanism begins to accelerate and its contribution to the overall system $NO_x$ levels may begin to increase significantly.

The zone of distributed burning via the apertures 140 also provides a region of fuel staging adjacent to the nozzle assembly 100. Altering the fuel/air ratio near the center body 120 allows the fractional flow 190 passing through the apertures 130 to burn at a higher equivalence ratio relative to the remainder flow 195. This may be advantageous for ignition, machine acceleration, low load operation, or sudden load transfers. As such, a single large nozzle assembly 100 may be able to replace multiple nozzles within a can. This replacement can amount to a significant part reduction and cost savings for the combustion system and engine as a whole.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

We claim:

1. A turbine system, comprising:
a mixed fuel-air flow; and
a gas turbine engine;
wherein the gas turbine engine comprises:
a combustion nozzle;
wherein the combustion nozzle comprises a center body; a mixed fuel-air flow inlet arranged perpendicularly to an outlet of the center body, the mixed fuel-air inlet in fluid communication with a mixed fuel-air inlet flow channel arranged parallel with a longitudinal axis of the conical body; and
a conical nozzle extending from the center body and expanding outwardly therefrom, the mixed fuel-air flow acts to cool a backside of the conical nozzle;
the conical nozzle comprising a plurality of apertures positioned therein;
wherein the plurality of apertures extends through the conical nozzle and spaced along the length of the conical nozzle in an array such that a fractional flow of the mixed fuel-air flow passes through the plurality of apertures from an exterior of the conical nozzle to an interior of the conical nozzle, wherein a remainder flow of the mixed fuel-air flow passes around the conical nozzle, and wherein the fractional flow burns at a higher equivalence ratio than the remainder flow and the remainder flow expands and recirculates via vortex breakdown of the conical nozzle and burns within the combustion chamber.

2. The turbine system of claim 1, wherein the conical nozzle comprises nickel or cobalt alloys.

3. The turbine system of claim 1, wherein the conical nozzle comprises an angle from a longitudinal central axis of about twenty (20) to about (70) degrees.

4. The turbine system of claim 1, wherein the conical nozzle comprises a length of about one (1) inch to about twelve (12) inches (about 25.4 millimeters to about 305 millimeters).

5. The turbine system of claim 1, wherein the plurality of apertures comprises a diameter of about 0.05 to about 0.5 inches (about 1.27 to about 12.7 millimeters).

6. The turbine system of claim 1, wherein the plurality of apertures comprises about ten (10) to about 2000 apertures.

7. A method of directing a flow of air and fuel through and about an outwardly expanding conical nozzle to a combustion chamber of a gas turbine engine, comprising:

forcing a fraction of the flow of air and fuel through a plurality of apertures spaced along the length of the outwardly expanding conical nozzle in an array from an exterior of the conical nozzle to an interior of the conical nozzle;

burning the fraction of the flow of air and fuel as it exits the plurality of apertures;

flowing the remainder of the flow of air and fuel over the outwardly expanding conical nozzle to cool a backside of the conical nozzle; and burning the remainder of the flow of air and fuel in the combustion chamber wherein the fractional flow burns at a higher equivalence ratio than the remainder flow and the remainder flow expands and recirculates via vortex breakdown of the conical nozzle.

8. The method of directing a flow of air and fuel of claim 7, wherein the fraction ranges from about ten (10) to about ninety (90) percent.

9. The method of directing a flow of air and fuel of claim 7, wherein the step of burning the fraction of the flow of air and fuel as it exits the plurality of apertures comprises burning in a plurality of discrete reaction zones.

10. The method of directing a flow of air and fuel of claim 7, wherein the step of burning the fraction of the flow of air and fuel as it exits the plurality of apertures comprises a plurality of fuel transport times.

11. The method directing a flow of air and fuel of claim 7, wherein the step of forcing a fraction of the flow of air and fuel through a plurality of apertures within the conical nozzle comprises a nonswirling flow and wherein the step of flowing the remainder of the flow of air and fuel over the nozzle comprises a swirling flow.

12. The method directing a flow of air and fuel of claim 7, further comprising the step of altering the ratio of the flow of fuel and air or the fraction or off the flow of air and fuel.

13. An engine, comprising:
a mixed fuel-air flow; and
a gas turbine engine;
wherein the gas turbine engine comprises:
a swirler;
a distributed jet combustion nozzle assembly positioned within the swirler; and
a combustion chamber positioned about the distributed jet combustion nozzle assembly;
wherein the distributed jet combustion nozzle assembly comprises a conical nozzle with a center body, the mixed fuel-air flow acts to cool a backside of the conical nozzle; a mixed fuel-air flow inlet arranged perpendicularly to an outlet of the center body, the mixed fuel-air inlet in fluid communication with a mixed fuel-air inlet flow channel arranged parallel with a longitudinal axis of the conical body; a plurality of apertures positioned therein in an array and expanding outwardly therefrom such that a fractional flow of the mixed fuel-air flow passes through the plurality of apertures from an exterior of the conical nozzle to an interior of the conical nozzle, wherein a remainder flow of the mixed fuel-air flow passes around the conical nozzle, and wherein the fractional flow burns at a higher equivalence ratio than the remainder flow and the remainder flow expands and recirculates via vortex breakdown of the conical nozzle and burns within the combustion chamber.

14. The engine of claim 13, wherein the conical nozzle comprises an angle from a longitudinal central axis of about twenty (20) to about (70) degrees.

15. The engine of claim 13, wherein the conical nozzle comprises a length of about one (1) inch to about twelve (12) inches (about 25.4 millimeters to about 305 millimeters).

16. The engine of claim 13, wherein the plurality of apertures comprises a diameter of about 0.05 to about 0.5 inches (about 1.27 to about 12.7 millimeters).

17. The engine of claim 13, wherein the plurality of apertures comprises about ten (10) to about 2000 apertures.

* * * * *